(12) United States Patent
Jain

(10) Patent No.: US 11,003,960 B2
(45) Date of Patent: May 11, 2021

(54) EFFICIENT INCIDENT MANAGEMENT IN LARGE SCALE COMPUTER SYSTEMS

(71) Applicant: Microsoft Technology Licensing, LLC, Redmond, WA (US)

(72) Inventor: Navendu Jain, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 368 days.

(21) Appl. No.: 15/990,179

(22) Filed: May 25, 2018

(65) Prior Publication Data
US 2019/0362197 A1  Nov. 28, 2019

(51) Int. Cl.
| | |
|---|---|
| G06K 9/62 | (2006.01) |
| G06K 9/54 | (2006.01) |
| G06K 9/46 | (2006.01) |
| G06K 9/66 | (2006.01) |
| G06N 3/04 | (2006.01) |
| G06N 3/08 | (2006.01) |
| G06F 9/54 | (2006.01) |

(52) U.S. Cl.
CPC ............. *G06K 9/6277* (2013.01); *G06F 9/54* (2013.01); *G06K 9/4609* (2013.01); *G06K 9/66* (2013.01); *G06N 3/04* (2013.01); *G06N 3/08* (2013.01)

(58) Field of Classification Search
CPC ...... G06K 9/6277; G06K 9/4609; G06K 9/66; G06F 9/54; G06N 3/04; G06N 3/08
See application file for complete search history.

(56) References Cited

U.S. PATENT DOCUMENTS

| | | | | |
|---|---|---|---|---|
| 4,441,105 A | * | 4/1984 | Van Vliet | G06F 3/153 345/467 |
| 4,523,331 A | * | 6/1985 | Asija | G06K 9/00 382/192 |

(Continued)

FOREIGN PATENT DOCUMENTS

WO      2017053208 A1      3/2017

OTHER PUBLICATIONS

"HashingVectorizer", Retrieved From: http://scikit-learn.org/stable/modules/generated/sklearn.feature_extraction.text.HashingVectorizer.html#sklearn.feature_extraction.text.HashingVectorizer, Retrieved on: Dec. 12, 2017, 6 Pages.

(Continued)

*Primary Examiner* — Kevin Ky
(74) *Attorney, Agent, or Firm* — Liang IP, PLLC

(57) ABSTRACT

Computing systems for efficient incident management in large scale computer systems are described herein. In one embodiment, an incident management system can be configured to, in response to receiving a user input requesting an unidentified incident management service, convert an alphanumerical string of the user input into a pixelated matrix having multiple pixels individually corresponding to a character or number in the alphanumerical string. The incident management system can then feed the converted pixelated matrix into a neural network to identify one or more incident management services corresponding to the received user input with a corresponding probability value. The incident management system can then perform an application programming interface (API) call to execute a computer application to provide one of the identified incident management services to the user.

20 Claims, 8 Drawing Sheets

(56) References Cited

U.S. PATENT DOCUMENTS

| | | | |
|---|---|---|---|
| 7,996,374 | B1 | 8/2011 | Jones et al. |
| 8,504,679 | B2 | 8/2013 | Spire et al. |
| 8,930,756 | B2 | 1/2015 | Jerde et al. |
| 9,032,420 | B2 | 5/2015 | Tse et al. |
| 9,047,348 | B2 | 6/2015 | Dayan |
| 9,715,496 | B1 * | 7/2017 | Sapoznik ................ G10L 15/26 |
| 9,891,983 | B1 | 2/2018 | DeChiaro |
| 10,192,148 | B1 * | 1/2019 | Yang .................... G06K 9/4642 |
| 2010/0272362 | A1 * | 10/2010 | Ohnishi ............. H04N 1/00374 382/187 |
| 2017/0004184 | A1 | 1/2017 | Jain et al. |
| 2017/0004205 | A1 | 1/2017 | Jain et al. |
| 2017/0206128 | A1 | 7/2017 | Anderson et al. |
| 2017/0365079 | A1 | 12/2017 | Hao et al. |
| 2018/0053207 | A1 | 2/2018 | Modani et al. |

OTHER PUBLICATIONS

"Pairwise_Distances", Retrieved From: http://scikit-learn.org/stable/modules/generated/sklearn.metrics.pairwise.pairwise_distances.html, Retrieved on: Dec. 12, 2017, 3 Pages.

"TfidfTransformer", Retrieved From: http://scikit-learn.org/stable/modules/generated/sklearn.feature_extraction.text.TfidfTransformer.html#sklearn.feature_extraction.text.TfidfTransformer, Retrieved on: Dec. 12, 2017, 5 Pages.

"International Search Report and Written Opinion Issued in PCT Application No. PCT/US19/031905", dated Jul. 30, 2019, 11 Pages.

* cited by examiner

EFFICIENT INCIDENT MANAGEMENT IN LARGE SCALE COMPUTER SYSTEMS

BACKGROUND

Large scale computer systems, such as datacenters or other suitable distributed computing systems can have millions or even tens of millions of individual components. For example, in a datacenter, a large number of routers, switches, bridges, load balancers, or other network devices can interconnect servers, network storage devices, and other computing devices. Individual servers can host one or more virtual machines, virtual switches, or other types of virtualized functions configured to provide computation, communications, storage, or other suitable types of computing services to users.

Many hardware and software components in a datacenter can experience various types of "incidents" such as hardware/software failures, over utilization of resources, misconfigurations, communication losses, etc. Sensors or monitors in the datacenter can monitor and report such incidents. In addition, such incidents can also cause service interruptions that can trigger a user of the service to initiate an alert or a service report. An incident management system is typically utilized to receive and process all incident reports. For example, an incident management system can receive and forward incident reports to suitable technicians or engineers and track a progress of diagnosis, mitigation, and resolution of each incident.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In certain implementations, an incident management (IcM) system can be configured to manage end-to-end workflow of incidents in a large scale computer system, such as a datacenter. For example, upon receiving an incident report, the incident management system can create a ticket or other suitable types of identifier for the reported incident. The incident management system can also track notification of the reported incident to technicians or engineers, diagnosis of the incident, mitigation applied to resolve the incident, follow-up communication to customers, or other suitable related tasks.

To minimize service downtime, an incident management system can provide a broad range of computer applications and IcM services for addressing various aspects of reported incidents. Examples of such IcM services can include incident triage, directory service for on-call technicians or engineers, notification chains of incidents, reporting and logging of incidents, and administration of incident resolution. Such IcM services can allow quick notification, mitigation, or resolution of reported incidents to minimize time-to-detect, time-to-engage, time-to-mitigate, or other suitable types of incident management metrics, and thus improve user experience of various functionalities in a large scale computer system.

One challenge of providing such a broad range of computer applications and IcM services is to provide an efficient mechanism for a large number of technicians, engineers, or other users to discover, search, call, report, and collaborate based on diverse functionalities in the incident management system. One solution for this challenge is building an interactive question and answer (Q&A) service that can provide identification of suitable IcM services for addressing certain aspects of particular incidents. However, building such an Q&A service can be difficult and time consuming due to a large amount of manual effort to cover a large number of diverse scenarios and complexities in understanding free-form or other suitable types of user input.

Several embodiments of the disclosed technology are directed to an incident management assistant (IcM assistant) that is configured to intelligently match user input with corresponding IcM services or other suitable types of IcM resources. For example, the IcM assistant can be configured to receive a user input (e.g., text) and provide one or more of application programming interface (API) calls, internal or external website or webpage links, frequently asked question (FAQ) links, or other suitable types of IcM functionalities. In some implementations, the IcM assistant can provide functionalities for a technician or engineer to view information (e.g., viewing details of an incident report) and perform actions on a reported incident, such as, searching and performing queries of previously detected similar incidents, etc. In other implementations, the IcM assistant can be configured to allow users to perform other suitable actions or engage in conversations (e.g., ask clarifying questions, gather background information about the incident and user).

In one aspect, the IcM assistant can be configured to match a user input to, for example, an API call by utilizing a trained convolutional neural network. For instance, the IcM can first convert the user input from a text string into a pixelated matrix or image with each pixel corresponding to a letter (e.g., "a" to "z" and "A" to "Z") and a number (e.g., "0", "1", ..., "9"). For example, a user input of "Ack IcM 123" would correspond to a matrix having a one for a pixel or cell values corresponding to "A", "c", "k", "I", "c", "M", "1", "2", "3" while the other pixels or cells all have a value of zero. In another embodiment, tri-grams of characters e.g., 'bit' can also be encoded in a similar manner as the individual characters. During a training phase, the IcM assistant can then perform one or more convolutions in the neural network using one or more filters or kernels on the pixelated matrix. Example filters can include a 2×2, 3×3, 4×4, 5×5, or other suitable sizes of matrix with corresponding element values. Use of different filters may be tuned by an administrator or other suitable entities for training. Training of the models can be done periodically e.g., weekly or on-demand.

By applying individual filters to the pixelated matrix, the IcM assistant can be configured to derive a new matrix with each row denoting filters applied and columns being dot product of the applied filter and underlying pixelated matrix when the filter is moved one pixel (or multiple pixels, referred to as a "stride") for every position. The IcM assistant can then be configured to apply an activation function (e.g., Sigmoid, tan h, or Rectified Linear Unit (ReLU)) before applying pooling (e.g., max pooling, average pooling, etc.) to the new matrix to generate a pooling layer of the neural network. The foregoing convolution and pooling operations can then be repeated on the obtained pooling layer with additional filters to encode incrementally higher-level patterns in the user input.

The IcM assistant can then be configured to generate an output from an output layer that is typically a fully connected network with dropout. For example, all outputs of the last pooling layer can be connected to all nodes in the output layer via a linear transformation e.g., ReLU. The output layer can produce a vector whose length is equal to a number of target classes (e.g., IcM services, APIs, knowledge base articles, feature areas, engineers) and individual elements denoting probability of a corresponding class. For example, the output layer may generate a probability of 90% for a class of "acknowledging incident report." In another example, the output layer may generate a probability of 85% for a class of "change on-call schedule." The IcM assistant can then be configured to execute one or more computer applications/routines/modules to provide an IcM service having the highest probably value or being selected by a user.

In certain implementations, the convolutional neural network can be trained using previous incident management data. For example, a set of data containing user input received and corresponding API calls can be used to train the neural network. The user input can be fed into the neural network with a set of weights for the user input to generate one or more probabilities of corresponding classes. The probabilities can then be compared to actual API calls and errors (ground truth) thereof may be generated. The generated errors can then be back-propagated into the neural network for adjusting one or more weights or other suitable parameters in the neural network. The foregoing operations can then be repeated until, for example, a loss function denoting the generated error between predicted and actual value is less than a threshold value, or other suitable criteria. The trained neural network can then be used to predict an intended API call for a new user input as described above.

Several embodiments of the disclosed technology can allow a large number of users to efficiently locate suitable computer applications or IcM services for performing various actions in an incident management system. Unlike manually building Q&As, several embodiments of the disclosed technology can convert user input from text to a pixelated matrix, which can then be fed into a trained neural network to generate probabilities of intended functions by a user. Embodiments of the disclosed technology can also further clarify user intensions by asking follow-up questions. For example, when predicted probabilities of two classes are the same or similar, both may be presented to a user for selection. In another example, the user can be asked a series of clarifying questions to boost the probability values. In other examples, certain classes may be excluded from the result according to user input. As such, the user can be provided with a list of computer services or resources that the user can then utilized to efficiently address various aspects of addressing a reported incident. As a result, a time-to-detect, time-to-engage, time-to-mitigate, or other suitable types of incident management metrics in a large scale computer system can be reduced when compared to other implementations.

DETAILED DESCRIPTION

Figure 1:
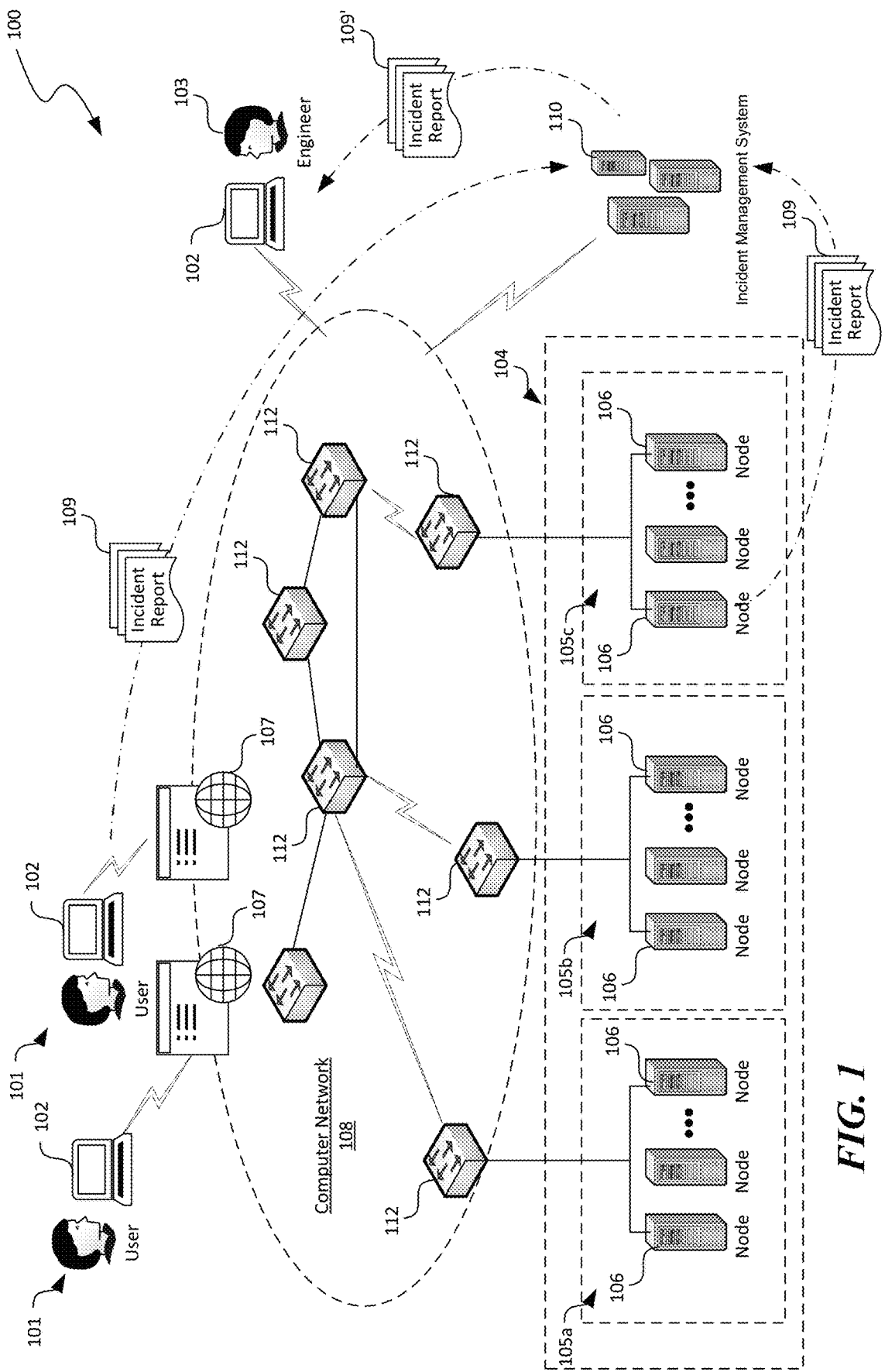
FIG. 1 is a schematic diagram illustrating a computing framework implementing efficient incident management in accordance with embodiments of the disclosed technology.

Certain embodiments of systems, devices, components, modules, routines, data structures, and processes for efficient incident management are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-6.

As used herein, the term "computing cluster" generally refers to a computing system having a plurality of network devices that interconnect multiple servers or nodes to one another or to external networks (e.g., the Internet). One example of a computing cluster is one or more racks each holding multiple servers in a cloud computing datacenter (or portions thereof) configured to provide cloud services. One or more computing clusters can be interconnected to form a "computing fabric," which forms at least a part of a distributed computing system. The term "network device" generally refers to a network communications component. Example network devices include routers, switches, hubs, bridges, load balancers, security gateways, or firewalls. A "node" generally refers to a computing device configured to implement one or more virtual machines, virtual routers, virtual gateways, or other suitable virtualized computing components. In one example, a node can include a computing server having a hypervisor configured to support one or more virtual machines.

Further used herein, the term "cloud service" generally refers to one or more computing resources provided over a computer network, such as the Internet. Common examples of cloud services include software as a service ("SaaS"), platform as a service ("PaaS"), and infrastructure as a service ("IaaS"). SaaS is a software distribution technique in which software applications are hosted by a cloud service provider in, for instance, datacenters, and accessed by users over a computer network. PaaS generally refers to delivery of operating systems and associated services over the computer network without requiring downloads or installation. IaaS generally refers to outsourcing equipment used to support storage, hardware, servers, network devices, or other components, all of which are made accessible over a computer network.

As used herein, the term "incident management service" or "IcM service" generally refers to a computing service or resource provided for addressing one or more aspect of an incident in a computer system, fabric, or cluster. Example incident management services can include computing services for viewing incident information (e.g., viewing details of an incident report) and performing actions on a reported incident, such as, searching and performing queries of previously detected similar incidents, etc. Incident management services can be provided by, for instance, application programming interface (API) calls, internal or external website or webpage links, frequently asked question (FAQ) links, other suitable types of IcM functionalities, or identification and/or contact of an engineer or technician that may be able to help resolve the issue.

As used herein, the phrase "neural network" or "artificial neural network" generally refers to computing systems configured to "learn," or progressively improve performance on tasks by studying examples, generally without task-specific programming. For example, in image recognition, a neural network may learn to identify images that contain cats by analyzing example images that have been manually labeled as "cat" or "no cat" and using the results to identify cats in new images.

In certain implementations, a neural network can include multiple layers of objects generally refers to as "neurons" or "artificial neurons." Each neuron can be configured to perform a function such as a non-linear activation function based on one or more inputs via corresponding connections. Artificial neurons and connections typically have a weight that adjusts as learning proceeds. The weight increases or decreases a strength of an input at a connection. Typically, artificial neurons are organized in layers. Different layers may perform different kinds of transformations on respective inputs. Signals typically travel from an input layer, to an output layer, possibly after traversing one or more intermediate layers.

Also used herein, "convolution" generally refers to a process of adding each element of an image to its local neighbors, weighted by a filter or kernel. For example, convolution of a 3×3 kernel and a 3×3 image is the process of transposing a first matrix and then multiplying corresponding entries and summing. The element at coordinates [2, 2] of an output image would be a weighted combination of all the entries of the image matrix, with weights given by the kernel. The values of a given pixel in the output image are calculated by multiplying each kernel value by the corresponding input image pixel values.

Further used herein, "pooling" generally refers to a form of non-linear down-sampling. Several non-linear functions exist to implement pooling, such as max pooling. In max pooling, an input image is partitioned into a set of non-overlapping rectangles and, for each such sub-region, outputs the maximum of the values in a sub-region to create a pooling layer. The pooling layer serves to progressively reduce a spatial size of representation, to reduce the number of parameters and amount of computation in a neural network.

In large scale computer systems, various types of incidents can be frequently generated. To minimize service downtime, an incident management system can provide a broad range of computer applications and services for addressing various aspects of the reported incidents. Examples of such services can include incident triage, directory service for on-call technicians or engineers, notification chains of incidents, reporting and logging of incidents, and administration of incident resolution. Such services can allow quick mitigation and/or resolution of incidents to minimize time-to-detect, time-to-engage, time-to-mitigate, or other suitable types of incident management metrics.

One challenge of providing such a broad range of computer application and services is to provide an automated and efficient mechanism for a large number of users to discover, search, call, report, and collaborate based on diverse functionalities in an incident management system. One solution for this challenge can include building an interactive question and answer (Q&A) service that provides identification of suitable services for addressing certain aspects of incidents. However, building such a Q&A service can be difficult due to large amount of manual effort required to cover a diversity of scenarios and complexities in understanding free-form or other suitable types of user input.

Several embodiments of the disclosed technology can provide an incident management assistant (IcM assistant) that is configured to match user input with corresponding services or other suitable types of incident management resources. For example, the IcM assistant can be configured to receive a user input and provide one or more of application programming interface (API) calls, internal or external website or webpage links, frequently asked question (FAQ) links, or other suitable available functionalities. In some implementations, the IcM assistant can provide functionalities for a user to view information (e.g., viewing details of an incident report) and perform actions on a reported incident, such as, searching and performing queries of previously detected similar incidents, etc. In other implementations, the IcM assistant can be configured to allow users to perform other suitable actions.

In one implementation, the IcM assistant can be configured to match a user input to, for example, an API call after optional pre-processing (e.g., to remove certain characters) by utilizing a trained neural network. For instance, the IcM can first convert the user input containing text into a pixelated matrix or image with each pixel corresponding to a letter (e.g., "a" to "z" and "A" to "Z") or a number (e.g., "0", "1", ..., "9"). For example, a user input of "Ack IcM 123" would correspond to a matrix having a one for a pixel corresponding to "A", "c", "k", "I", "c", "M", "1", "2", "3" while the other pixels all have a value of zero. In other examples, punctuation and other symbols e.g., hashtags can also be used for encoding. The IcM assistant can then perform one or more convolutions in the trained neural network using one or more filters or kernels on the pixelated matrix to derive a list of API calls with corresponding probabilities matching the user input.

Unlike manually building Q&As, several embodiments of the disclosed technology can thus match user input with an intended incident management resource using machine learning. As such, the user can be provided with a list of computer services or resources that the user can then utilized to efficiently address various aspects of addressing a reported incident. As a result, a time-to-detect, time-to-engage, time-to-mitigate, or other suitable types of incident management metrics in a large scale computer system can be reduced, as described in more detail below with reference to FIGS. 1-6.

FIG. 1 is a schematic diagram of a computing framework 100 configured for efficient incident management in accordance with embodiments of the disclosed technology. As shown in FIG. 1, the computing framework 100 can include a computer network 108 interconnecting a plurality of users 101 via client devices 102, a computing fabric 104, and an incident management system 110. Even though particular components of the computing framework 100 are shown in FIG. 1, in other embodiments, the computing framework 100 can also include additional and/or different constituents. For example, the computing framework 100 can include additional computing fabrics, network storage devices, utility infrastructures, and/or other suitable components.

The client devices 102 can each include a computing device that facilitates corresponding users 101 to access cloud services provided by the computing fabric 104 via the computer network 108. For example, in the illustrated embodiment, the client devices 102 individually include a desktop computer. In other embodiments, the client devices 102 can also include laptop computers, tablet computers, smartphones, or other suitable computing devices. Even though two users 101 and corresponding client devices 102 are shown in FIG. 1 for illustration purposes, in other embodiments, the computing framework 100 can facilitate any suitable number of users 101 to access computing services provided by the computing fabric 104.

As shown in FIG. 1, the computer network 108 can include one or more network devices 112 that interconnect the users 101 and components of the computing fabric 104. Examples of the network devices 112 can include routers, switches, firewalls, load balancers, or other suitable network components. Even though particular connection scheme is shown in FIG. 1 for illustration purposes, in other embodiments, the network devices 112 can be operatively coupled in a hierarchical, flat, "mesh," or other suitable topologies. In one embodiment, the computer network 108 includes the Internet. In other embodiments, the computer network 108 can also include a local area network, a wide area network, a virtual private network, or other suitable types of computer network.

In certain embodiments, the nodes 106 can individually include a processor, a physical server, or a blade containing several physical servers. In other embodiments, the nodes 106 can also include a virtual server or several virtual servers. The nodes 106 can be organized into racks, availability zones, groups, sets, computing clusters, or other suitable divisions. For example, in the illustrated embodiment, the nodes 106 are grouped into three computing clusters 105 (shown individually as first, second, and third computing clusters 105a-105c, respectively), which are operatively coupled to corresponding network devices 112 in the computer network 108. Even though three computing clusters 105 are shown in FIG. 1 for illustration purposes, in other embodiments, the computing fabric 104 can include one, two, eight, sixteen, or any other suitable numbers of computing clusters 105 with similar or different components and/or configurations.

The incident management system 110 can be configured to manage end-to-end workflow of incidents in the computing fabric 104. For example, upon receiving an incident report 109, from a user 101 via the portal 107, or from a node 106, the incident management system 110 can create a ticket or other suitable types of identifier for the reported incident. The incident management system 110 can then track notification of the reported incident to an engineer 103 (e.g., via another incident report 109'), diagnosis of the incident, mitigation applied to resolve the incident, and follow-up communication to customers.

The incident management system 110 can include an incident assistant (as IcM assistant 120 shown in FIG. 2A) that is configured to intelligently match a user input with corresponding IcM services (e.g., API calls) or other suitable types of incident management resources by first converting a user input into a matrix representation (e.g., into a pixelated matrix or image) and then performing prediction on the pixelated matrix using a trained neural network. Using such a technique, labor intensive manual Q&A creations may be avoided, as described in more detail below with reference to FIGS. 2A-2D.

Figure 2A:
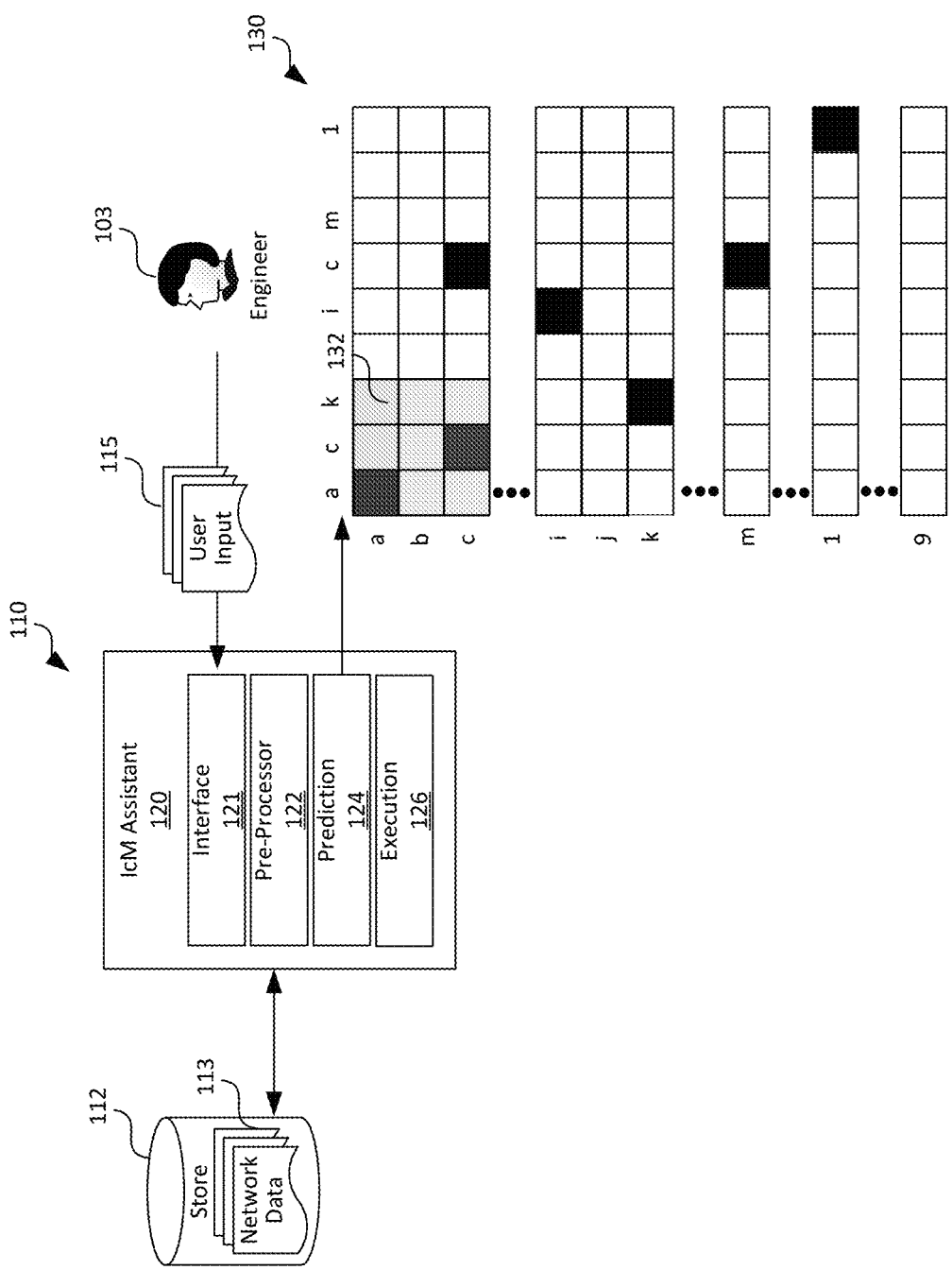
FIGS. 2A-2D are partially schematic diagrams illustrating certain hardware/software components of the computing framework of FIG. 1 in accordance with embodiments of the disclosed technology.

FIGS. 2A-2D are partially schematic diagrams illustrating certain hardware/software components of the computing framework 100 of FIG. 1 in accordance with embodiments of the disclosed technology. As shown in FIG. 2A, the incident management system 110 can include an IcM assistant 120 configured to intelligently match a user input with corresponding IcM services (e.g., API calls) or other suitable types of incident management resources. In the illustrated embodiment, the IcM assistant 120 can be a software component executing in the incident management system 110. In other embodiments, the IcM assistant 120 can be a standalone application or have other suitable configurations.

As shown in FIG. 2A, the IcM assistant 120 can include an interface component 121, a pre-processor 122, a prediction component 124, and an execution component 126 operatively coupled to one another. Even though only the foregoing components are shown for the IcM assistant 120 in FIG. 2A, in other embodiments, the IcM assistant 120 can include additional and/or different components.

The interface component 121 can be configured to receive a user input 115 from a user, such as an engineer 103, for locating an IcM resource in the incident management system 110. The user input 115 can contain free-form text or other suitable types of an alphanumeric string. The interface component 121 can then forward the received user input 115 to the pre-processor 122 for further processing.

The pre-processor 122 can be configured to perform various editing tasks on the received user input 115 based on certain preset rules. For example, in one embodiment, the pre-processor 122 can be configured to performing stemming on the user input 115 to reduce words to a corresponding word stem, base, or root form. In another example, the pre-processor 122 can also be configured to remove camel casing according to which each word or abbreviation in a middle of a compound phrase begins with a capital letter. In further examples, the pre-processor 122 can also be configured to remove punctuation, special characters, stop words, lower case letters, punctuations, extract special tags such as hashtags, parse base64 encoded images, separate logs from commands, to find more information about the user or ongoing incidents, or to perform other suitable editing tasks.

Once pre-processing is complete, the pre-processor 122 can forward the pre-processed user input 115 to the prediction component 124 for identifying one or more IcM resources (e.g., API calls) in the incident management system 100. As shown in FIG. 2A, in accordance with embodiments of the disclosed technology, the prediction component 124 can initially convert the pre-processed user input 115 from a test string into a pixelated matrix or image 130 with each pixel corresponding to a letter (e.g., "a" to "z" and "A" to "Z") and a number (e.g., "0", "1", . . . , "9") and a position of a character or number in the user input 115. For instance, as shown in FIG. 2A, the example user input 115 can include a text string "ack icm 1." Correspondingly, the prediction component 124 can be configured to assign a value (e.g., 1) to a corresponding pixel in the pixelated matrix 130. Thus, at position [1, 1] of the pixelated matrix 130, the pixel has a value of 1, as represented by a darkened square, corresponding to "a" in the example user input 115. At position [3, 2], the pixel has a value of 1 corresponding to "c" in the example user input 115, etc. In other examples, each pixel of the pixelated matrix 130 can be assigned other suitable values corresponding to a letter or number.

The prediction component 124 can then be configured to feed the pixelated matrix 130 into a convolutional neuro network for identifying one or more IcM resources with corresponding probability values. the prediction component 124 can retrieve one or more weights or other suitable parameters of the neural network (identified as "Network Data 113) from a network store 112. In certain implementations, the convolutional neural network can be trained using previous incident management data. For example, a set of data containing previous user input 115 received and corresponding API calls can be used to train the neural network. The previous user input 115 can be fed into the neural network with a set of initial weights to generate one or more probabilities of corresponding classes of the user input 115. The probabilities can then be compared to actual API calls and errors thereof may be generated. The generated errors can then be back-propagated into the neural network for adjusting one or more weights or other suitable parameters in the neural network. The foregoing operations can then be repeated until, for example, a generated error is less than a threshold value, or other suitable criteria. The weights or other suitable parameters of the neural network can then be stored in the network store 112 as network data 113. In other implementations, the neural network can be continuously or periodically retrained with additional data representing received user input 115 and corresponding IcM resources.

Using the retrieved network data 113, the prediction component 124 can be configured to perform one or more convolutions on the pixelated matrix 130 using one or more filters 132. Example filters can include a 2×2, 3×3, 4×4, 5×5, or other suitable sizes of matrix with corresponding element values. Use of different filters may be tuned by an administrator or other suitable entities. In the illustrated example, the filter 132 includes a 3×3 matrix that can have suitable element values for detecting various features in the pixelated matrix 130. For instance, the filter 132 can include a matrix having 1s diagonally for detecting a slanted edge. In another example, the filter 132 can also include a matrix having 1s vertically or horizontally in a center of the filter 132 for detecting a vertical or horizontal edge, respectively.

Figure 2B:
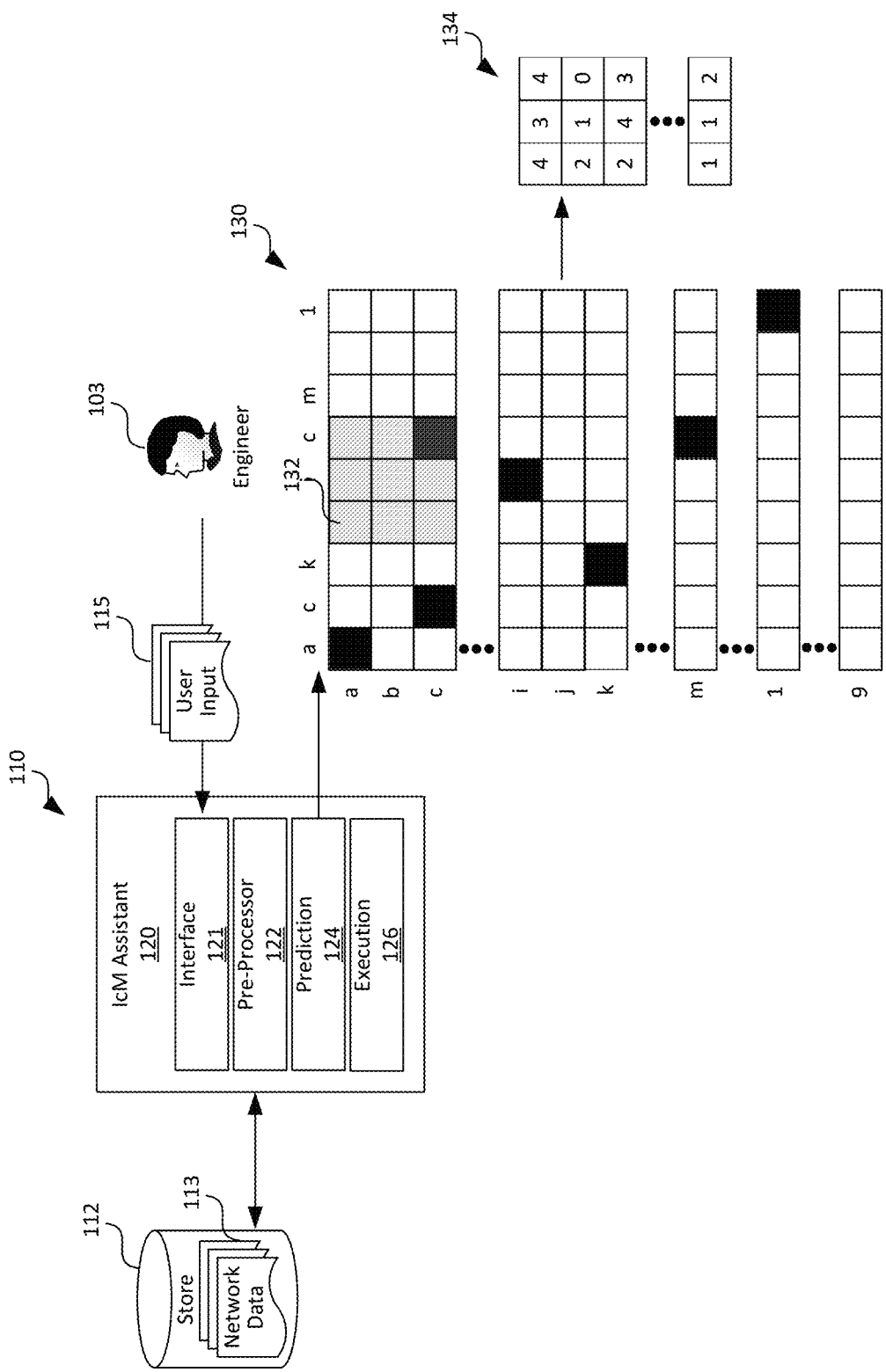
Figure 2C:
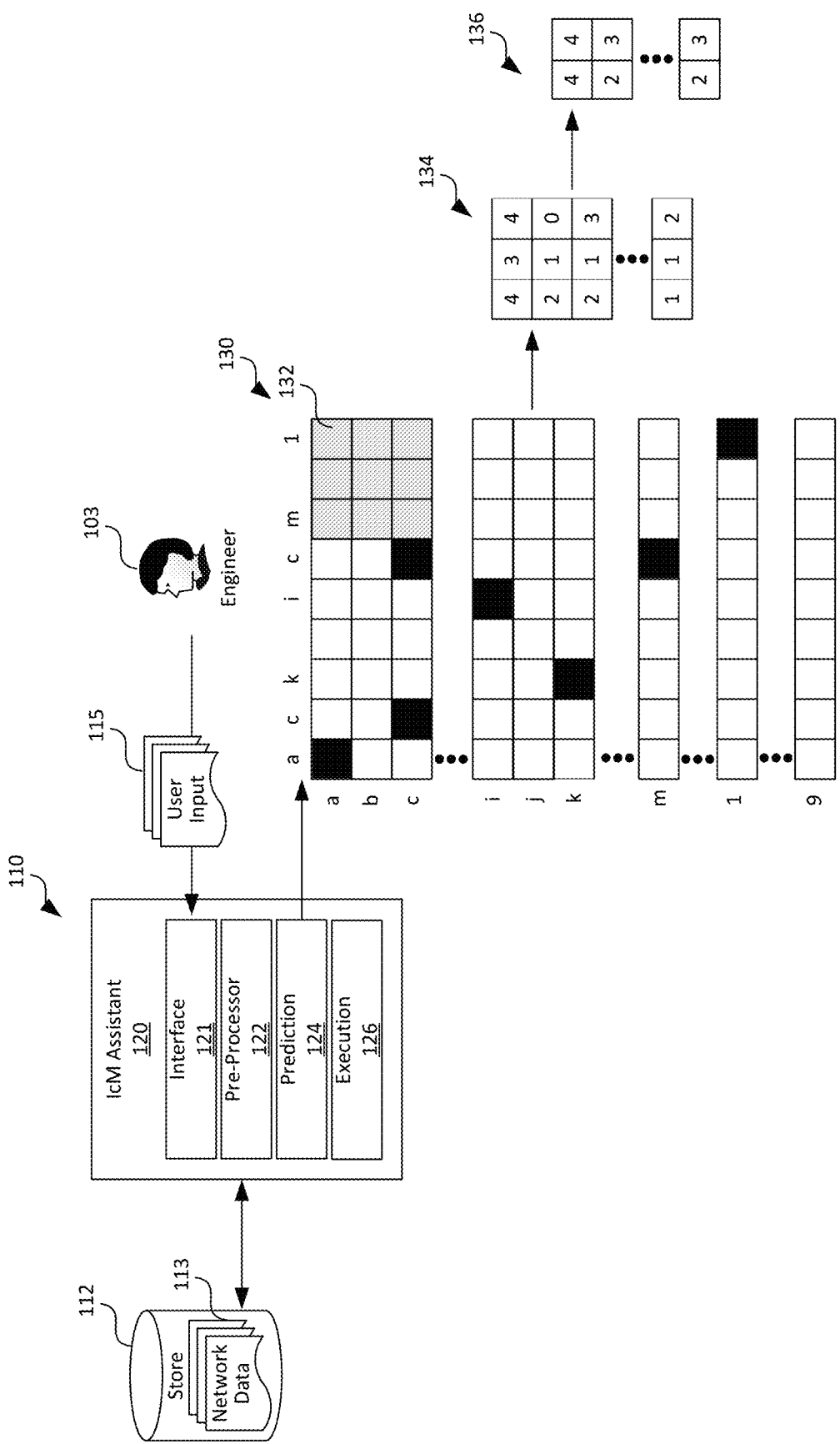

As shown in FIG. 2B, by applying the filter 132 to the pixelated matrix 130, the prediction component 124 can be configured to derive a new matrix 134 with each row denoting filters applied and columns being dot product of the applied filter 132 and underlying pixelated matrix 130 when the filter 132 is moved one pixel (or multiple pixels) for every position. The prediction component 124 can then be configured to apply a non-linear activation function (e.g., Sigmoid, tan h, or Rectified Linear Unit (ReLU)) before applying pooling (e.g., max pooling, average pooling, etc.) to the new matrix to generate a pooling layer 136 of the neural network. The foregoing convolution and pooling operations can then be repeated on the obtained pooling layer 136 with additional filters (not shown) to encode incrementally higher-level patterns in the user input 115. In certain implementations, the neural network can include 3-7 pooling layers. In other implementations, the neural network can include any other suitable numbers of pooling layers.

Figure 2D:
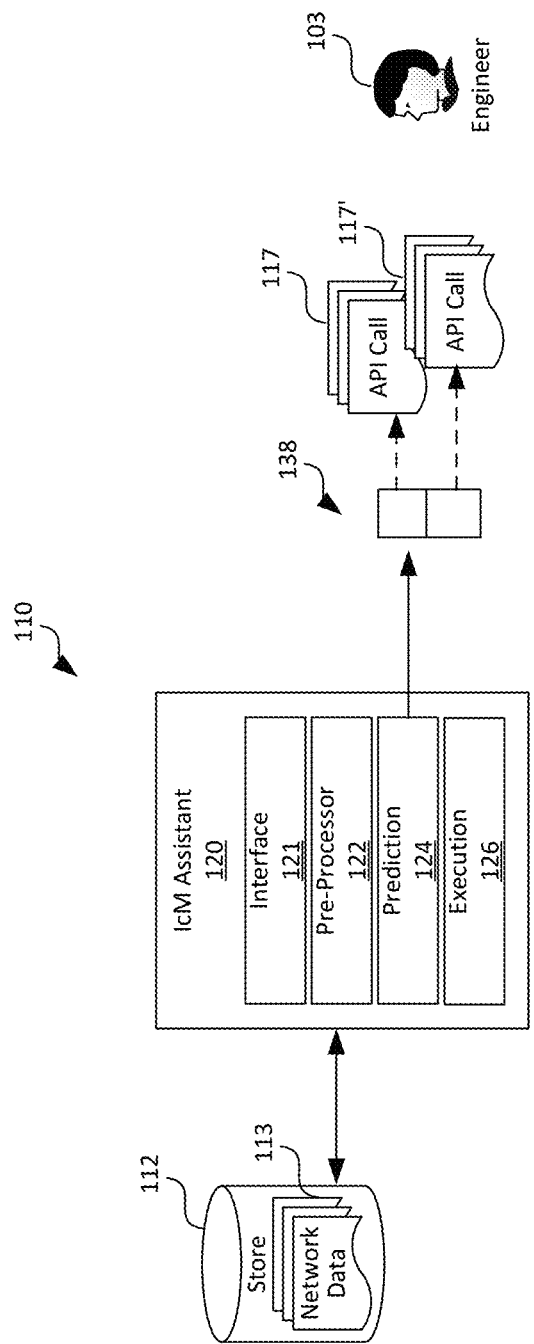

As shown in FIG. 2D, the prediction component 124 configured to generate an output from an output layer 138 that is typically a fully connected network with dropout according to which only certain connections between nodes are taken into account. For example, all outputs of the last pooling layer 136 (not shown) can be connected to all nodes in the output layer 138 via a linear transformation e.g., ReLU. The output layer 138 can produce a vector whose length denotes a number of target classes of classification and individual elements can denote probability of a corresponding class. For example, in the illustrated embodiment, the output layer 138 may generate a probability of 90% for a class of "acknowledging incident report," corresponding to a first API call 117, and a probability of 5% for a class of "change on-call schedule," corresponding to a second API call 117'.

Based on the generated probability values, the prediction component 124 can be configured to output a ranked list of API calls 117 to the engineer 103. In certain embodiments, the prediction component 124 can also be configured to determine whether all arguments for the outputted API calls 117 are extracted from the user input 115. In response to determining that one or more arguments are missing, the prediction component 124 can be configured to request additional user input from the engineer 103. In response to determining that all needed arguments are present, the prediction component 124 can be configured to pass control to the execution component 126 for further processing.

In certain embodiments, the execution component 126 can be configured to receive a user selection from the engineer 103 of one of the outputted API calls 117. In response, the execution component 126 can execute the selected API call 117 with the identified arguments to provide a suitable IcM resource to the engineer 103. In other embodiments, the execution component 126 can be configured to automatically execute a computer application or routine via one of the API calls 117 without further input from the engineer 103 when a corresponding probability value exceeds a threshold (e.g., 90%) or has the highest value. In further embodiments, the execution component 126 can also be configured to provide an internal or external website or webpage, a frequently asked question (FAQ) page, or other suitable types of IcM functionalities to the engineer 103 based on the determined probability values and/or user selections.

Several embodiments of the disclosed technology can thus allow a large number of technician, engineers, or other users to efficiently locate suitable computer applications or IcM services for performing various actions in an incident management system. Unlike manually building Q&As, several embodiments of the disclosed technology can convert user input 115 from text to a pixelated matrix 130, which can then be fed into a trained neural network to generate probabilities of intended functions by a user. As such, the user can be provided with a list of IcM services or resources that the user can then utilized to efficiently address various aspects of addressing a reported incident. As a result, a time-to-detect, time-to-engage, time-to-mitigate, or other suitable types of incident management metrics in a large scale computer system can be reduced when compared to other implementations.

Figure 3:
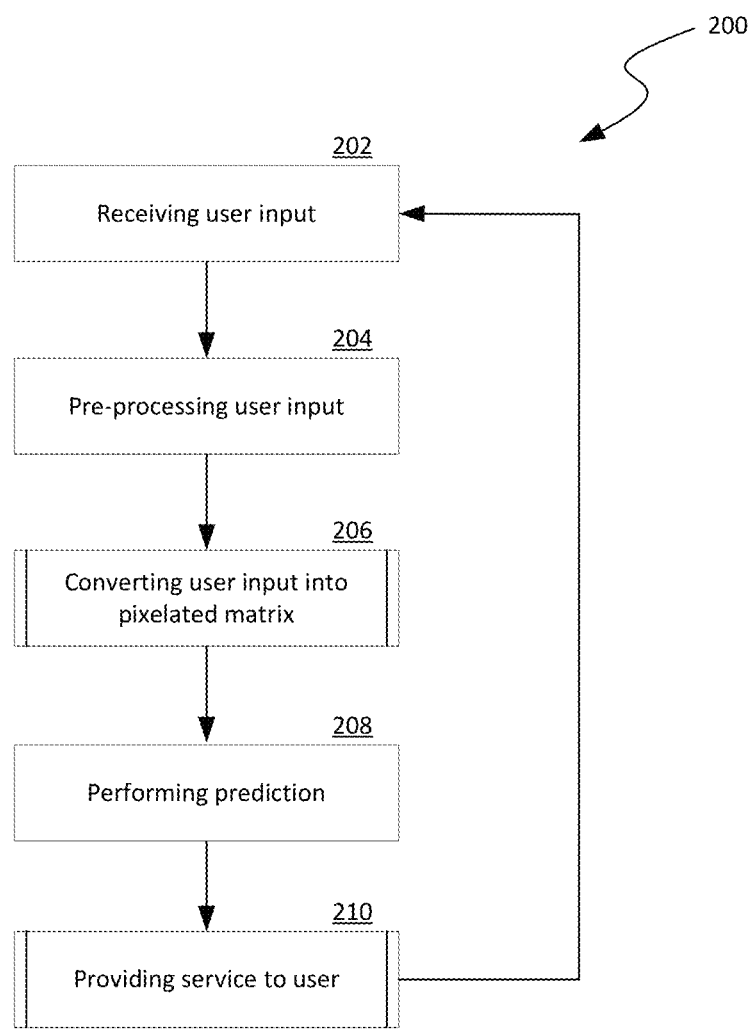
FIGS. 3-5 are flowcharts illustrating certain processes of efficient incident management in accordance with embodiments of the disclosed technology.
Figure 4:
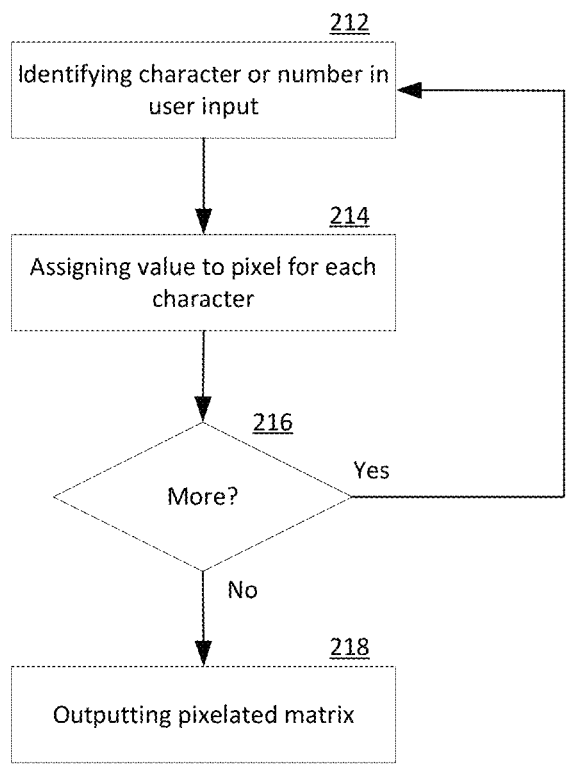
Figure 5:
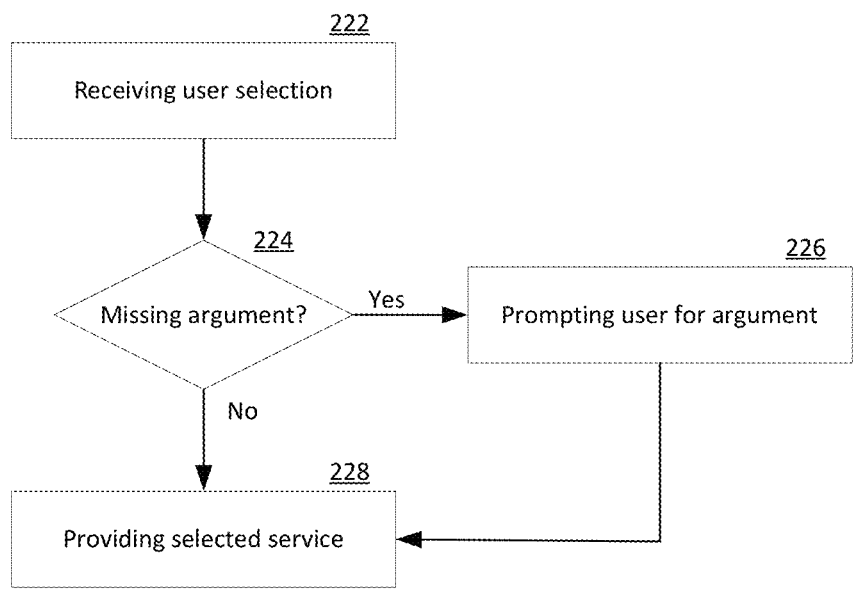

FIGS. 3-5 are flowcharts illustrating certain processes of efficient incident management in accordance with embodiments of the disclosed technology. Even though the processes are described below with reference to the computing framework 100 in FIG. 1 and the IcM assistant 120 in FIGS. 2A-2D, in other embodiments, the processes may be implemented in other computing frameworks with additional and/or different components.

As shown in FIG. 3, a process 200 of efficient incident management can include receiving a user input at stage 202. In one embodiment, the user input can include free-form text input. In other embodiments, the user input can include other suitable types of alphanumerical input. The process 200 can then include pre-processing the received user input at stage 204. As described above with reference to FIG. 2A, in certain embodiments, various editing operations may be performed on the received user input such as stemming and removing punctuations. In other embodiments, pre-processing the received user input may be omitted.

The process 200 can then include converting the pre-processed user input into a pixelated matrix at stage 206. As described in more detail above with reference to FIG. 2A, the user input can be converted into a pixelated matrix with each row corresponding to a letter (e.g., "a" to "z") or number (e.g., "0" to "9") and columns containing a value corresponding to a letter or number in the user input. As such, in one implementation, the user input can be converted into a pixelated matrix of 36 rows (e.g., 26 for letters and 10 for numbers) and a suitable number of columns corresponding to a length of the user input. In other implementations, the user input can be converted into a pixelated matrix of other suitable sizes. Example operations of converting user input into a pixelated matrix are described in more detail below with reference to FIG. 4.

The process 200 can then include performing prediction of a suitable IcM resource corresponding to the user input at stage 208. In certain implementations, as described in more detail above with reference to FIGS. 2A-2D, performing prediction can include feeding the pixelated matrix into a convolutional neural network trained with data representing previous user input and corresponding IcM resources. The process 200 can then include providing a suitable IcM service to the user based on the performed prediction at stage 210. Example operations of providing the IcM service to the user are described in more detail below with reference to FIG. 5. As shown in FIG. 3, in certain embodiments, the process 200 can revert back to receiving additional user input at stage 202 in order to clarify or narrow down a number of provided IcM services.

FIG. 4 illustrates example operations of converting user input into a pixelated matrix. As shown in FIG. 4, the operations can include identifying a character or number in the user input at stage 212. For example, the identified character can be a letter from "a" to "z" while the number can be from "0" to "9." The operations can then include assigning a value (e.g., 1) to a pixel corresponding to the identified character or number in the pixelated matrix at stage 214. The operations can then include a decision stage 216 to determine whether additional characters or numbers are present in the user input. In response to determining that additional characters or numbers are present in the user input, the operations revert to identifying a next character or number at stage 212. Otherwise, the operations include outputting the pixelated matrix with the assigned values at stage 218.

FIG. 5 illustrates example operations for providing the IcM service to the user. As shown in FIG. 5, the operations can include receiving a user selection of an outputted list of IcM resources (e.g., API calls) ranked based on a corresponding predicted probability value. The operations can then include a decision stage 224 to determine whether a selected IcM resource (e.g., an API call) has missing argument. In response to determining that the selected IcM resource does not include any missing argument, the operations proceed to providing the selected IcM service by, for example executing the API call at stage 228. In response to determining that the selected IcM resource includes missing argument, the operations proceed to prompting the user for input of the missing argument at stage 226 before proceeding to providing the selected IcM service at stage 228.

Figure 6:
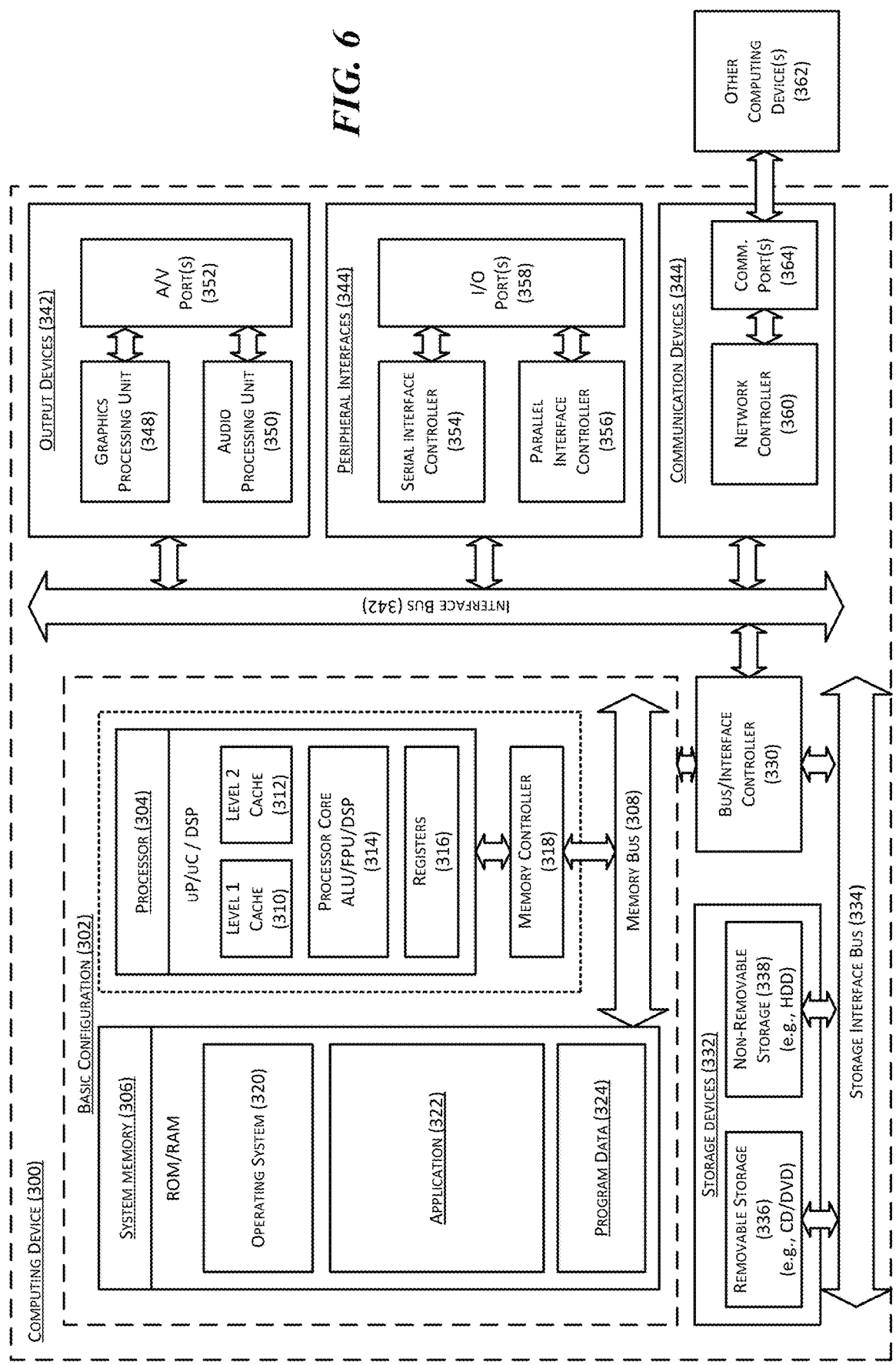
FIG. 6 is a computing device suitable for certain components of the computing framework in FIG. 1.

FIG. 6 is a computing device 300 suitable for certain components of the computing framework 100 in FIG. 1. For example, the computing device 300 can be suitable for the client devices 102 or the nodes 106 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 10 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

Specific embodiments of the technology have been described above for purposes of illustration. However, various modifications can be made without deviating from the foregoing disclosure. In addition, many of the elements of one embodiment can be combined with other embodiments in addition to or in lieu of the elements of the other embodiments. Accordingly, the technology is not limited except as by the appended claims.

I claim:

1. A method of efficient incident management in a computer system having multiple servers, the method comprising:

receiving, from a user, a user input requesting an unidentified incident management service for addressing an incident related to one or more servers in the computer system, the user input containing an alphanumerical string in a language;

in response to receiving the user input, converting the alphanumerical string of the user input into a digital image organized as a pixelated matrix having multiple pixels of the digital image individually corresponding to a letter, character, or number in the alphanumerical string of the language;

processing the converted pixelated matrix of the digital image in a neural network to identify the requested incident management service having a highest probability value corresponding to the received user input, the neural network being trained based on data of previous user input and corresponding incident management services; and executing a computer application in the computer system via an application programming interface (API) call to provide the identified incident management service having the highest probability value to the user.

2. The method of claim 1, further comprising:

in response to receiving the user input, pre-processing the received user input via stemming to reduce words in the user input to a corresponding word stem, base, or root form, removing camel casing, or removing punctuation or special characters; and wherein converting the alphanumerical string includes converting the alphanumerical string of the pre-processed user input into the pixelated matrix.

3. The method of claim 1 wherein converting the alphanumerical string includes:

identifying a character or number in the alphanumerical string of the user input; and in response to identifying the character or number, assigning a preset value to a pixel in the pixelated matrix, the pixel corresponding to the identified character and a position of the identified character in the alphanumerical string.

4. The method of claim 1 wherein converting the alphanumerical string includes:

identifying a character or number in the alphanumerical string of the user input; and in response to identifying the character or number, assigning a preset value to a pixel in the pixelated matrix, the pixel corresponding to the identified character and a position of the identified character in the alphanumerical string; and repeating the identifying and assigning to generate the pixelated matrix with a preset number of rows and a number of columns corresponding to a length of the alphanumerical string.

5. The method of claim 1 wherein converting the alphanumerical string includes:

identifying a character or number in the alphanumerical string of the user input; and in response to identifying the character or number, assigning a preset value to a pixel in the pixelated matrix, the pixel corresponding to the identified character and a position of the identified character in the alphanumerical string; and repeating the identifying and assigning to generate the pixelated matrix with thirty six rows and a number of columns corresponding to a length of the alphanumerical string.

6. The method of claim 1 wherein processing the converted pixelated matrix includes:

repeatedly applying a filter to the pixelated matrix to generate a new matrix;

applying a non-linear activation function to the new matrix; and applying pooling to the new matrix applied with the non-linear activation function to generate a pooling layer.

7. The method of claim 1 wherein processing the converted pixelated matrix includes:

applying a filter to the pixelated matrix to generate a new matrix;

applying a non-linear activation function to the new matrix, the non-linear activation function including one of Sigmoid function, tan h function, or Rectified Linear Unit function; and applying one of max or average pooling to the new matrix applied with the non-linear activation function to generate a pooling layer.

8. The method of claim 1 wherein processing the converted pixelated matrix includes:

applying a filter to the pixelated matrix to generate a new matrix;

applying a non-linear activation function to the new matrix, the non-linear activation function including one of Sigmoid function, tan h function, or Rectified Linear Unit function;

applying one of max or average pooling to the new matrix applied with the non-linear activation function to generate a pooling layer; and repeating the applying a filter operation, applying a non-linear activation function operation; and applying one of max or average pooling operation to the generated pooling layer to generate another pooling layer to encode incrementally higher-level patterns in the user input.

9. The method of claim 1 wherein processing the converted pixelated matrix includes:
applying a filter to the pixelated matrix to generate a new matrix;
applying a non-linear activation function to the new matrix, the non-linear activation function including one of Sigmoid function, tan h function, or Rectified Linear Unit function;
applying one of max or average pooling to the new matrix applied with the non-linear activation function to generate a pooling layer;
repeating the applying a filter operation, applying a non-linear activation function operation; and applying one of max or average pooling operation to the generated pooling layer to generate another pooling layer to encode incrementally higher-level patterns in the user input; and
generating and outputting, to the user, a vector whose length denoting a number of target classes of the incident management service and individual elements denoting a probability value of a corresponding class.

10. The method of claim 1 wherein converting the alphanumerical string includes:
identifying a character or number in the alphanumerical string of the user input; and
in response to identifying the character or number, assigning a preset value to a pixel in the digital image, the pixel corresponding to the identified character and a position of the identified character in the alphanumerical string.

11. The method of claim 1 wherein converting the alphanumerical string includes:
identifying a character or number in the alphanumerical string of the user input; and
in response to identifying the character or number,
assigning a preset value to a pixel in the digital image, the pixel corresponding to the identified character and a position of the identified character in the alphanumerical string; and
repeating the identifying and assigning to generate the digital image with a preset number of rows and a number of columns corresponding to a length of the alphanumerical string.

12. An incident management system in a computer system having multiple servers, the incident management system comprising:
a processor; and
a memory operatively coupled to the processor, the memory containing instructions executable by the processor to cause the incident management system to:
in response to receiving a user input containing an alphanumerical string in a language requesting an unidentified incident management service,
convert the alphanumerical string of the user input into a digital image organized as a pixelated matrix having multiple pixels individually corresponding to a letter, character, or number in the alphanumerical string of the language;
feed the converted pixelated matrix into a neural network to identify one or more incident management services corresponding to the received user input, the one or more incident management services individually having a corresponding probability value; and
perform an application programming interface (API) call in the computer system to execute a computer application to provide one of the identified incident management services to the user.

13. The incident management system of claim 12 wherein the memory contains additional instructions executable by the processor to cause the incident management system to:
in response to receiving the user input, pre-process the received user input via stemming to reduce words in the user input to a corresponding word stem, base, or root form, removing camel casing, or removing punctuation or special characters; and
wherein to convert the alphanumerical string includes to convert the alphanumerical string of the pre-processed user input into the pixelated matrix.

14. The incident management system of claim 12 wherein to convert the alphanumerical string includes to:
identify a character or number in the alphanumerical string of the user input; and
in response to identifying the character or number, assign a preset value to a pixel in the pixelated matrix, the pixel corresponding to the identified character and a position of the identified character in the alphanumerical string.

15. The incident management system of claim 12 wherein to convert the alphanumerical string includes to:
identify a character or number in the alphanumerical string of the user input; and
in response to identifying the character or number,
assign a preset value to a pixel in the pixelated matrix, the pixel corresponding to the identified character and a position of the identified character in the alphanumerical string; and
repeat the identifying and assigning to generate the pixelated matrix with a preset number of rows and a number of columns corresponding to a length of the alphanumerical string.

16. The incident management system of claim 12 wherein to feed the converted pixelated matrix includes to:
apply a filter to the pixelated matrix to generate a new matrix;
apply a non-linear activation function to the generated new matrix; and
apply pooling to the new matrix applied with the non-linear activation function to generate a pooling layer.

17. The incident management system of claim 12 wherein to feed the converted pixelated matrix includes to:
apply a filter to the pixelated matrix to generate a new matrix;
apply a non-linear activation function to the new matrix, the non-linear activation function including one of Sigmoid function, tan h function, or Rectified Linear Unit function; and
apply one of max or average pooling to the new matrix applied with the non-linear activation function to generate a pooling layer.

18. The incident management system of claim 12 wherein to feed the converted pixelated matrix includes to:
apply a filter to the pixelated matrix to generate a new matrix;
apply a non-linear activation function to the new matrix, the non-linear activation function including one of Sigmoid function, tan h function, or Rectified Linear Unit function;
apply one of max or average pooling to the new matrix applied with the non-linear activation function to generate a pooling layer; and repeating the foregoing operations on the generated pooling layer to generate another pooling layer to encode incrementally higher-level patterns in the user input.

19. A method of efficient incident management in a computer system having multiple servers, the method comprising:

receiving, from a user, a user input requesting an unidentified incident management service for addressing an incident related to one or more servers in the computer system, the user input containing an alphanumerical string in a language;

in response to receiving the user input, converting the alphanumerical string of the user input into a digital image having multiple pixels individually corresponding to a letter, character, or number in the alphanumerical string of the language;

processing the converted digital image in a neural network to identify the requested incident management service having a highest probability value corresponding to the alphanumerical string of the received user input, the neural network being trained based on data of previous user input and corresponding incident management services; and executing a computer application in the computer system via an application programming interface (API) call to provide the identified incident management service having the highest probability value to the user.

20. The method of claim 19, further comprising:

in response to receiving the user input, pre-processing the received user input via stemming to reduce words in the user input to a corresponding word stem, base, or root form, removing camel casing, or removing punctuation or special characters; and wherein converting the alphanumerical string includes converting the alphanumerical string of the pre-processed user input into the digital image.

* * * * *